R. SCHUSTER.
GALVANIC BATTERY.
APPLICATION FILED DEC. 16, 1915.
1,240,885. Patented Sept. 25, 1917.
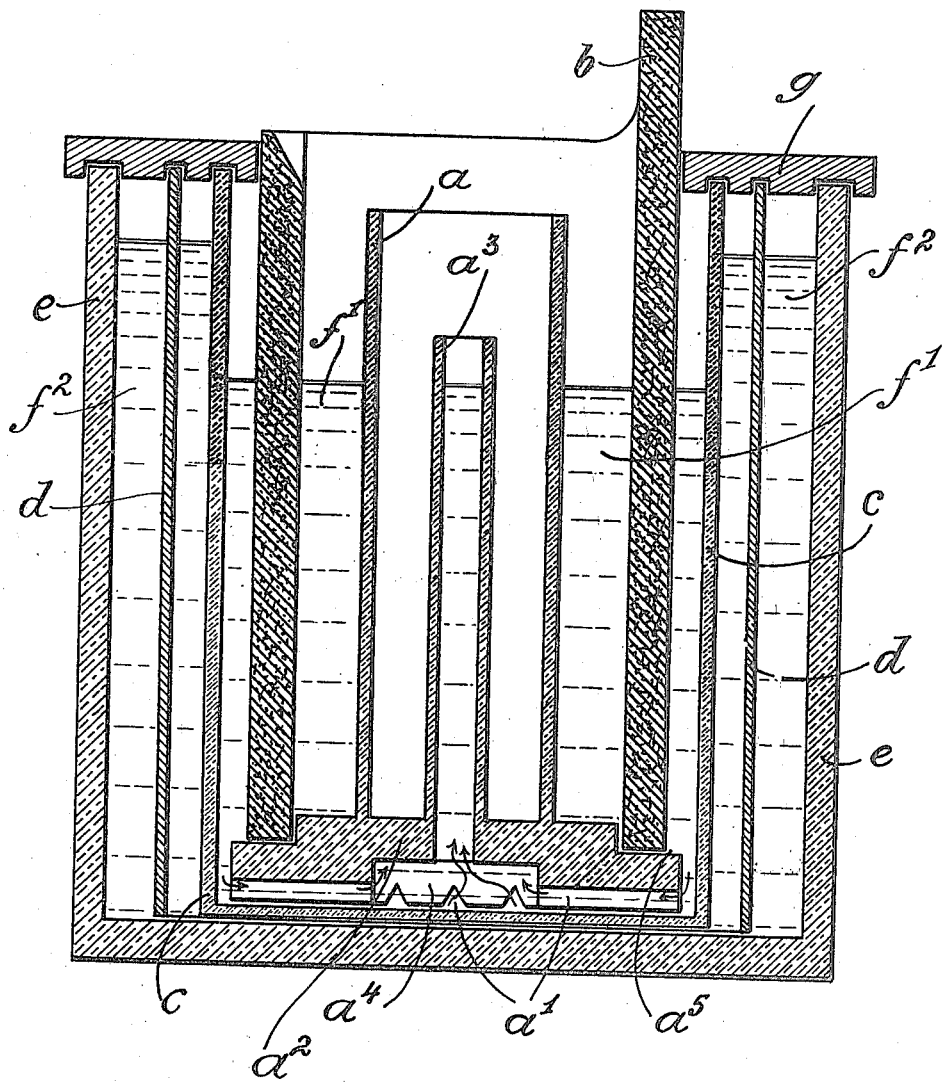

UNITED STATES PATENT OFFICE.

RICHARD SCHUSTER, OF PUPPLING, BAVARIA, GERMANY, ASSIGNOR, BY MESNE ASSIGNMENTS, TO SCHUSTER-PATENT-GESELLSCHAFT, OF BERLIN, GERMANY.

GALVANIC BATTERY.

1,240,885.  Specification of Letters Patent.  Patented Sept. 25, 1917.

Application filed December 16, 1915. Serial No. 67,195.

*To all whom it may concern:*

Be it known that I, RICHARD SCHUSTER, a subject of the German Emperor, and residing at Puppling, German Empire, have invented certain new and useful Improvements in Galvanic Batteries, of which the following is a specification.

The present invention relates to an improved primary galvanic battery of relatively high, constant terminal voltage (about 2.7 volts). This cell, which employs two electrolytes, is cheap in manufacture and up-keep, is odorless, and is specially adapted for charging storage batteries; its novel feature essentially residing in the provision of a container or standpipe with overflow ascending pipe, arranged centrally of, and in communication with the cathode cell, for the purpose of receiving the products of decomposition given off by the cathode electrolyte which would otherwise seriously interfere with the proper operation of the battery.

In order to make my invention more readily understood, I will now describe it in detail with reference to the accompanying drawing which represents a vertical section through the new cell.

The battery consists of the conventional outer jar $e$ of glass or the like, the porous cup $c$ containing the cathode electrolyte $f^1$, and the carbon member $b$, and in the annular space between the jar and the porous cup the anode electrolyte $f^2$ and the annular zinc member $d$, which parts are all nested in well known manner. Within the porous cup, centrally thereof and of the carbon member, there is provided an impervious container or standpipe $a$ of glass, porcelain or the like, rising from a foot plate $a^2$, which latter may be stepped circumferentially as at $a^5$ to receive the lower edge of the carbon member. The foot plate, further, is chambered as at $a^4$ and is provided with laterally extending bores or passages $a^1$, and an ascending pipe $a^3$, open at the top and communicating below with said chamber $a^4$, rises from the foot plate, centrally of the cell, to somewhat below the upper edge of the container $a$.

The cathode electrolyte consists of a solution of 500 grams of bichromate of soda in 1000 grams of water, to which 580 cubic centimeters of crude, concentrated sulfuric acid of a specific gravity of 1.84 have been added. Care must be taken in mixing the several ingredients to prevent heating-up. The anode electrolyte is a solution of 150 to 200 grams of caustic potash in 1000 grams water, or as much of the potash as will cause the cooled-off solution to indicate 20° Baumé. The most favorable ratio of consumption of the two electrolytic fluids $f^1$ and $f^2$ has been found to be 1:2.5.

The porous cup $c$ is made absolutely impervious in its upper portion, say about four-tenths of its height, as indicated by the heavier shading in the drawing. This impermeability is necessary for keeping the two fluids of highly different specific gravity under a certain relative pressure, which is obtained at the start by filling-in the two fluids to different levels, the fluid $f^2$ of the higher level being prevented by the impervious cup portion from diffusing through the diaphragm above the lower level of the fluid $f^1$.

The operation of the cell is the following:—During operation products of decomposition are given-off by the electrolyte $f^1$ in the annular space between the carbon member and the porous cup $c$, which would tend to enhance the internal resistance of the cell and cause a considerable drop in the voltage. In my battery now these decomposition products creep through the radial passages $a^1$ into the recess $a^4$ of the foot plate $a^2$, ascend in the central standpipe $a^3$, as indicated by the arrows, and finally fall over into the container $a$. In this manner these noxious substances are automatically continuously carried off. Slowly, by pressure equalization, due to the different specific gravities of the electrolytes, the level of fluid $f^2$ sinks and that of fluid $f^1$ rises, which eventually would cause the latter to run over and thereby interfere with the current production, were it not for the above described elimination of the products of decomposition.

The specifically lighter electrolyte $f^2$ increases in weight, and the specifically heavier electrolyte $f^1$ grows lighter in operation; but with the described arrangement of cell parts even then constant terminal voltage is assured when the two fluids have attained equal levels.

The electrochemical pressure, which causes the high terminal voltage, is due to the high percentage of oxygen in the carbon electrolyte $f^1$.

Though there may be eliminated inconsiderable amounts of the fresh electrolyte, especially at the beginning, yet the main product of decomposition is water, which is proven by the fact that the decomposition product indicates 28° Baumé, while the electrolyte $f^1$ indicates 47° Baumé throughout the operation.

A further advantage of my improved battery, which may be conveniently provided with a cover $g$, lies in the fact that the cell is reversible.

What I claim is:—

1. In combination with a galvanic battery having an anode electrolyte and a cathode electrolyte, means for eliminating the products of decomposition of the said cathode electrolyte, comprising an impervious container, a footplate to said container having a recess and passages laterally extending from said recess, and an ascending pipe in said container in communication with said foot plate recess.

2. In a galvanic battery, in combination, an outer container, a partly impervious porous cell, an anode electrolyte and a zinc member in the space between said outer container and said porous cell; a cathode electrolyte and a carbon member in said porous cell; and means, located within said porous cell, for eliminating the products of decomposition given-off by the cathode electrolyte, comprising an impervious standpipe, a footplate to this latter, said foot plate having a recess and passages laterally extending from said recess, and an overflow pipe within said standpipe in communication with said foot plate recess.

3. In a galvanic battery, in combination, an outer container, a partly impervious porous cell, an anode electrolyte and a zinc member in the space between said outer container and said porous cell; a cathode electrolyte and a carbon member in said porous cell; and means, located within said porous cell, for eliminating the products of decomposition given-off by the cathode electrolyte, comprising an impervious standpipe, a stepped footplate to this latter, said footplate having a bottom chamber and passages communicating with said chamber, and a second stand-pipe of smaller diameter and somewhat shorter than the first said stand-pipe, said second stand-pipe being arranged centrically within the first said stand-pipe and in communication with said footplate chamber.

In testimony whereof I affix my signature in presence of two witnesses.

RICHARD SCHUSTER.

Witnesses:
W. S. SPIEGELBERG,
CARL MAYER.

Copies of this patent may be obtained for five cents each, by addressing the "Commissioner of Patents, Washington, D. C."